T. J. KING.
COTTON CHOPPER.
APPLICATION FILED NOV. 23, 1908.

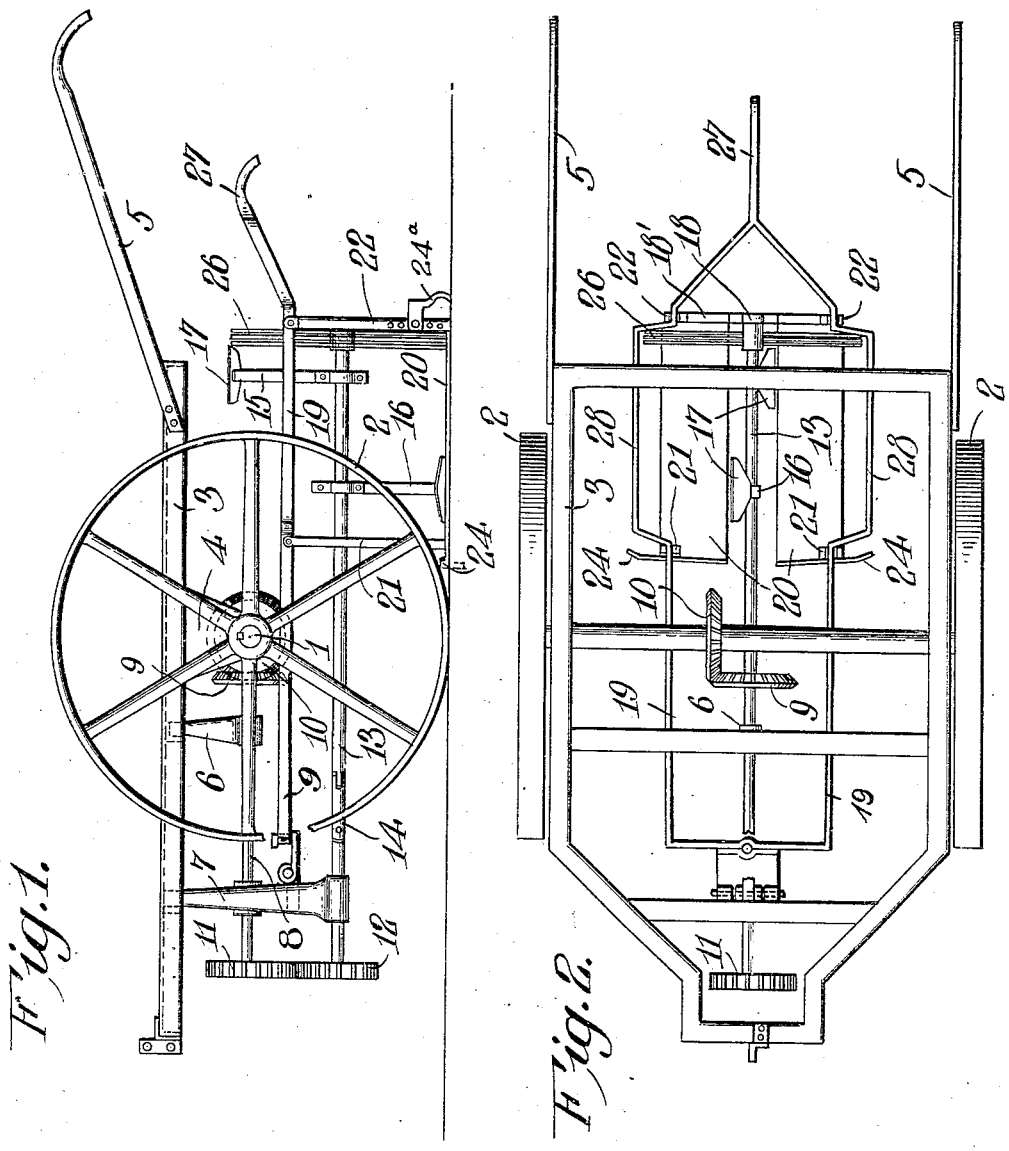

936,136.

Patented Oct. 5, 1909.
2 SHEETS—SHEET 2.

Witnesses
C. E. Smith.
C. H. Griesbauer

Inventor
T. J. King.
By H. B. Willson & Co
Attorneys

UNITED STATES PATENT OFFICE.

THOMAS J. KING, OF RICHMOND, VIRGINIA.

COTTON-CHOPPER.

936,136.      Specification of Letters Patent.      Patented Oct. 5, 1909.

Application filed November 23, 1908. Serial No. 464,021.

*To all whom it may concern:*

Be it known that I, THOMAS J. KING, a citizen of the United States, residing at Richmond, in the county of Henrico and State of Virginia, have invented certain new and useful Improvements in Cotton-Choppers; and I do declare the following to be a full, clear, and exact description of the invention, such as will enable others skilled in the art to which it appertains to make and use the same.

My invention relates to cotton choppers and the object of the invention is to provide a machine of this character which will work through the whole surface of the ground to clean out the grass and thin the cotton to a stand and which will continuously weed and side up or throw dirt to the cotton. The difficulty heretofore encountered in choppers of this character is that while they block the cotton, they sometimes cut deep and sometimes shallow, there being no regularity in the cutting depth. Hence, often the cotton is left on a little mound that will dry out and injure plants. Frequently, the hoes in striking deep will tear out the space intended to be left, especially where the land is crusty or there is any trash left on it.

It is the object of this invention to avoid these difficulties by providing a machine which essentially consists in a hoeing mechanism which cuts evenly and shallow always together with a weeder mechanism which cuts continuously so that every particle of the surface is lightly scratched, and which will clean and thin out stalks left in the spaces for plants.

With the foregoing and other objects in view, the invention consists in certain novel features of construction, combination and arrangement of parts, as will be more fully described and particularly pointed out in the appended claim.

Figure 3:
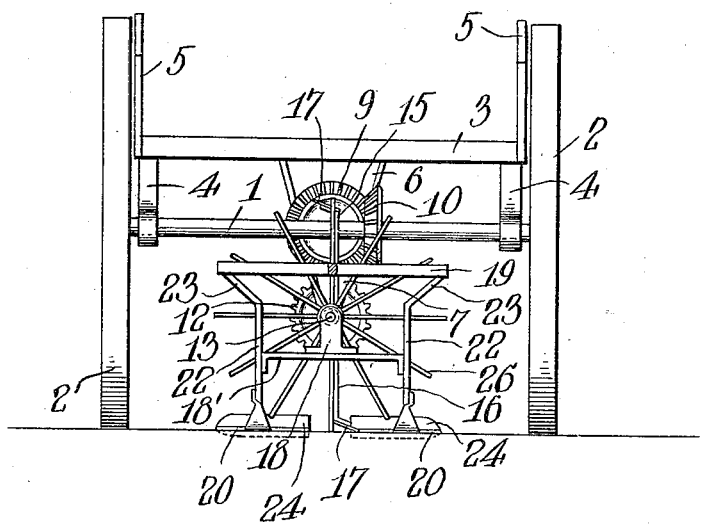
Figure 4:
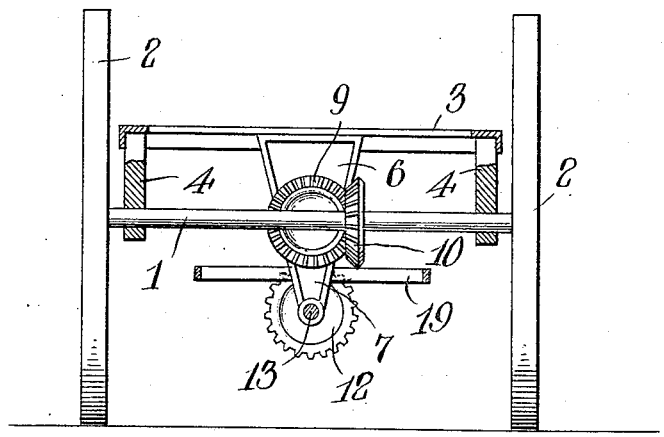

In the accompanying drawings, Figure 1 is a side elevation; Fig. 2 is a top plan view; Fig. 3 is a rear end elevation, and, Fig. 4 is a central transverse section.

Referring more particularly to the drawing, 1 represents the axle of the vehicle which is supported upon wheels 2 as is shown. The main frame 3 of the device is supported upon upstanding brackets 4 which are journaled upon the axle 1 at either side thereof. The rear end of the frame carries the guiding handles 5 and the forward portion of the frame has connected to it the usual draft mechanism (not shown).

Depending from the forward portion of the main frame adjacent the axle 1 is a bearing bracket 6 and forward of this a similar but longer bearing bracket 7 both of which are adapted to support the longitudinal driving shaft 8 provided upon its inner end with a beveled pinion 9 meshing with a similar pinion 10 upon the axle 1 and the forward end of the shaft 8 is provided with a gear 11 which meshes with a similar gear 12 upon the hoe shaft 13. This latter shaft extends rearwardly for a short distance beyond the bracket 7 where it is provided with a universal coupling 14 to connect the forward and rear ends of the shaft.

The rear end of the shaft has adjustably secured thereon the hoe arms 15 and 16 which carry the cutting hoes 17 adapted to revolve with the shaft which has its rear end journaled in a bearing element 18, carried by the cross bar 18' bridged between the standards on the auxiliary frame 19. This auxiliary frame is supported upon runners 20 by standards 21 and 22 which project vertically from the runners for a short distance and then are bent outwardly as at 23 to support the side members of the frame 19, whereby they are spread apart sufficiently to give room for the movement of the hoes.

Each runner 20 is provided at its forward end with a cultivator point 24 which forms in the ground a run-way or path for the runners 20. The rear standards 22 are provided with adjustable cultivator points 24ª which are adapted to throw dirt to the cotton. Keyed to the shaft adjacent the standard 22 are a plurality of closely arranged fingers 26 which rotate with the shaft 13 and are adapted to scratch up and weed the ground around the cutting blades.

The forward end of the frame 19 is preferably pivoted as shown to the bracket 7 so as to permit universal swinging and the rear end of the frame 19 is provided with a suitable guiding handle 27.

The operation of the invention it is thought will be apparent from an inspection of the drawings but it is thought well to mention the fact that the frame 19, being unsupported except at its forward end and pivoted in such a manner as to permit universal adjustment, allows the runners 20 to glide upon the ground and to raise and lower the hoe shaft according to the contour of the surface over which they are traveling, thus obtaining a uniform cut for the hoes and a uniform fitting and cultivating of the ground by the fingers 26.

It will be noticed in the plan view that the frame 19 has its side members bent outwardly as at 28 to permit the passage of the hoes and the fingers and is then bent back into line with the rear end so as to occupy less space.

Various changes in the form, proportion and the minor details of construction may be resorted to without departing from the principle or sacrificing any of the advantages of the invention, as defined in the appended claim.

I claim as my invention:—

In a cotton chopper, the combination with a supporting axle, of a main frame carried thereby, a driven shaft operated by the axle and supported by the main frame, a driven shaft supported by the main frame and operated by the driving shaft, a freely movable shaft having a universal joint connection with the driving shaft, runners, standards projecting up from said runners, a frame supported at its rear end upon said standards, means for supporting the rear end of said shaft on the standards so as to permit the whole to be freely movable, hoes adjustably mounted on said shaft, cultivator fingers secured to said shaft to rotate therewith, a furrow opener secured to each of the runners at their forward ends to form paths for the runners, and means connected to the rear standards for throwing dirt to the cotton.

In testimony whereof I have hereunto set my hand in presence of two subscribing witnesses.

THOMAS J. KING.

Witnesses:
C. W. WINN,
S. E. BROWN.